United States Patent [19]
Ehrmann

[11] Patent Number: 4,553,763
[45] Date of Patent: Nov. 19, 1985

[54] SEAL RING HAVING AN AXIS PARALLEL INTERMEDIATE RING

[75] Inventor: Peter Ehrmann, Hemsbach, Fed. Rep. of Germany

[73] Assignee: Carl Freudenberg, Weinheim, Fed. Rep. of Germany

[21] Appl. No.: 585,487

[22] Filed: Mar. 1, 1984

[30] Foreign Application Priority Data

Mar. 3, 1983 [DE] Fed. Rep. of Germany ....... 3307470

[51] Int. Cl.⁴ ............................................. F16J 15/32
[52] U.S. Cl. .................................. 277/153; 277/134; 277/166
[58] Field of Search ............... 277/134, 152, 153, 157, 277/163, 166

[56] References Cited

U.S. PATENT DOCUMENTS

| | | | |
|---|---|---|---|
| 4,114,898 | 9/1978 | Bainard | 277/153 X |
| 4,252,329 | 2/1981 | Messenger | 277/153 X |
| 4,274,641 | 6/1981 | Cather | 277/153 |
| 4,344,631 | 8/1982 | Winn | 277/153 X |
| 4,449,717 | 5/1984 | Kitawaki et al. | 277/153 |

FOREIGN PATENT DOCUMENTS

| | | | |
|---|---|---|---|
| 711737 | 10/1941 | Fed. Rep. of Germany | 277/153 |
| 861346 | 12/1952 | Fed. Rep. of Germany | 277/153 |
| 1217715 | 5/1966 | Fed. Rep. of Germany | 277/134 |
| 1342278 | 9/1963 | France | 277/134 |
| 621526 | 4/1949 | United Kingdom | 277/134 |
| 919370 | 2/1963 | United Kingdom | 277/153 |

*Primary Examiner*—Robert S. Ward
*Attorney, Agent, or Firm*—Felfe & Lynch

[57] ABSTRACT

A seal ring has a lip ring which is at least radially resilient and has a sealing lip for sealing about a reprocating or rotating machine part and a support surface axially spaced from the sealing lip. A reinforcing ring is radially spaced from the lip ring and coaxial therewith. An intermediate ring extends, in part, approximately parallel to the axis of the lip and reinforcing rings. It joins the lip ring at one end within the axial range of the support surface and, via the axis parallel part, joins the reinforcing ring at its other end within an axial region bounded by the sealing lip and the end of the support surface axially remote therefrom. This arrangement of the intermediate ring accommodates radial displacement of the machine part without displacing of the sealing lip from the machine part by tilting moments.

3 Claims, 1 Drawing Figure

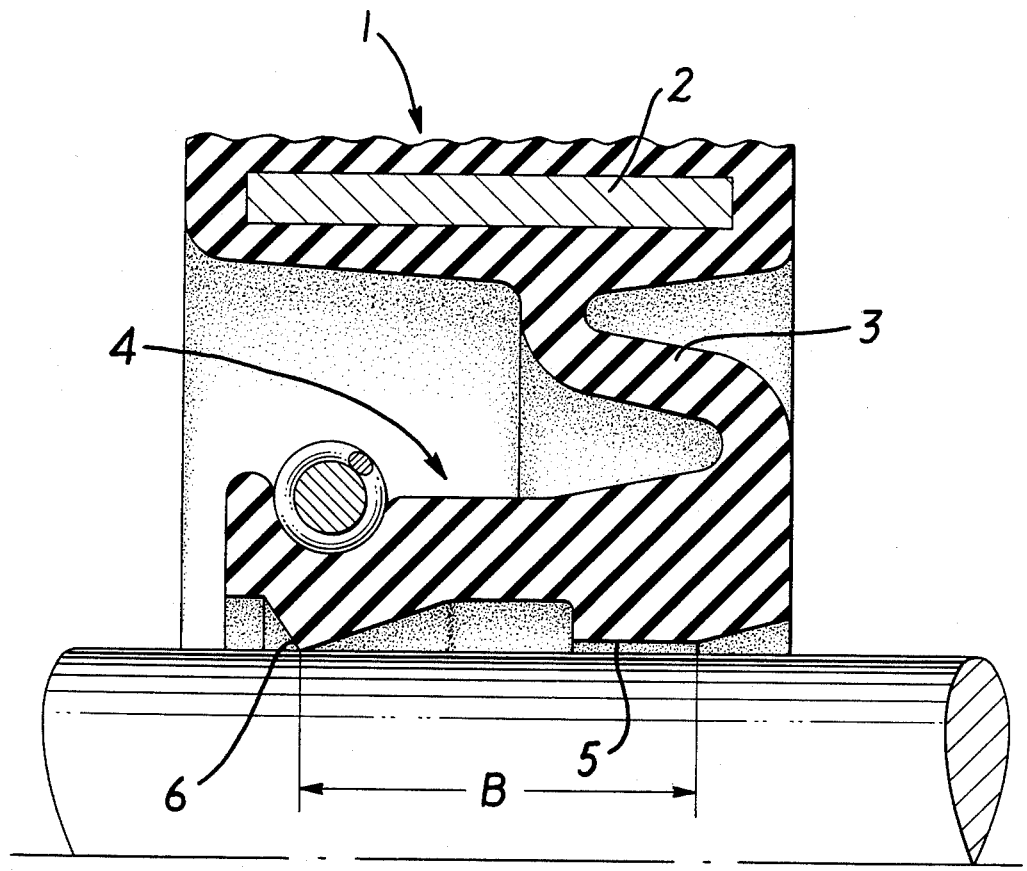

SEAL RING HAVING AN AXIS PARALLEL INTERMEDIATE RING

The invention relates to a seal ring for a machine part which executes reciprocating and/or rotary motions.

A known seal ring has a lip ring made of a resilient material and having a support surface, a reinforcing ring radially spaced therefrom, and an intermediate ring which, within the range of the support surface, joins the lip ring and the reinforcing ring. By extending at least partly non-radially, the intermediate ring allows radial displacement of the lip ring.

A seal ring of this type is described in U.S. Pat. No. 4,274,641. It is intended for sealing shafts which are subject to pronounced radial displacements. However, its operating behavior is not satisfactory. In particular, pronounced axial displacements of the sealing lip and/or fluctuations in the forces exerted by the sealing lip on the countersurface occur, both of which are undesirable.

The invention therefore has as its object providing a seal ring which is not subject to axial displacements of the sealing lip and fluctuations in its contact pressure on the countersurface even in the presence of pronounced radial displacements of the sealed machine part. In embodiments in whch the sealing lip of the lip ring is formed by two intersecting conical surfaces, it is also sought to maintain the angles which these conical surfaces make with the sealed surface substantially unchanged even when a radial displacement of the sealed machine part occurs.

To accomplish these objects, a seal ring is proposed in accordance with the present invention in which radially-spaced, coaxial lip and reinforcing rings are joined by an intermediate ring which extends, in part, approximately parallel to the axis of the lip and reinforcing rings. The lip ring is at least radially resilient and has a sealing lip for sealing about a relatively-reciprocating or-rotating machine part and, axially spaced therefrom, a support surface. One end of the intermediate ring joins the lip ring within the axial range of the support surface and, via its axis parallel part, the other end joins the reinforcing ring within an axial region bounded by the sealing lip and the end of the support surface axially remote therefrom.

The proposed design is based on recognition of the fact that the wall thickness of the intermediate ring cannot be reduced at will when the conditions normally prevailing in practice are taken into consideration. In addition to the torque, which in shaft seals is introduced through the sealing lip, the stresses resulting from installation as well as the pressure of the medium to be sealed must be absorbed. The wall thickness therefore should not be under a certain minimum, and this results in a marked stiffness which is undesirable.

While this problem is encountered also in the design proposed in accordance with the invention, it will not adversely affect the operating behavior obtained since the introduction of a tilting moment when radial displacements of the sealed machine element occur is prevented. The conditions prevailing at the sealing lip thus remain constant, and effective sealing action over long periods of time is thus obtained.

Nor will appreciable axial displacements of the sealing lip occur when the sealed machine element is radially displaced since the intermediate ring extends at least partly approximately parallel to the axis. Deviations of ±15 degrees are readily tolerated.

The exact point where the intermediate ring is joined to the reinforcing ring depends on the particular configuration of the lip ring. Configurations designed for sealing against elevated pressures are of relatively stiff and inflexible construction, and the intermediate ring should in this case be joined to the reinforcing ring axially within the region bounded by the suppport surface and the sealing lip, and preferably halfway between them. On the other hand, when the lip ring is intrinsically flexible and comprises, for example, a sealing lip which is articulated to the lip ring as such, it is advisable to join the intermediate ring to the reinforcing ring axially within the region occupied by the support surface, and preferably at its midpoint also in this case. Minor deviations can readily be tolerated.

An exemplified embodiment of the proposed seal ring is illustrated in the accompanying drawing and will now be described in greater detail.

The seal ring, shown in a half-sectional view, consists of a reinforcing ring 1 and, joined thereto by a diaphragm-like intermediate ring 3, a lip ring 4. The reinforcing ring 1 contains a stiffening insert 2 formed by a cylindrical pipe section. It is therefore nonresilient in the radial direction and after installation is statically sealed relative to the housing bore which accommodates it by the rubber layer which externally envelopes the stiffening insert 2.

The lip ring comprises a sealing lip 6 which is formed by two intersecting conical surfaces. In the axial direction it is intrinsically nonresilient and thus suited for sealing a medium which is under elevated pressure.

At its end remote from the sealing lip 6, the lip ring comprises a support surface 5 which surrounds the sealed shaft and is slightly spaced therefrom. When radial shaft displacements occur, the support surface and the shaft come into contact with each other, and the lip ring is thus displaced accordingly, with elastic deformation of the intermediate ring 3.

The intermediate ring 3 has only a very small wall thickness and consequently is distinguished by high flexibility and resilience. It has an S-like shape which terminates perpendicularly to the axis of rotation in the lip ring and the reinforcing ring and extends predominantly in a direction which makes a 15-degree angle with the axis of rotation. The point where the intermediate ring is joined to the reinforcing ring is approximately midway in the axial direction along the portion B of the lip ring 4 which is bounded by the support surface 5 and the sealing lip 6.

What is claimed is:

1. A seal ring, comprising:
   a lip ring (4) which is at least radially resilient and has a sealing lip (6) and a support surface (5) axially spaced from the sealing lip;
   a reinforcing ring (1) radially spaced from the lip ring and coaxial therewith; and
   a resilient intermediate ring (3) which extends, in part, approximately parallel to the axis of the lip and reinforcing rings, is joined at one end to the lip ring within the axial range of the support surface and, via the axis parallel part, is joined at the other end to the reinforcing ring within an axial region (B) bounded by the sealing lip and the end of the support surface axially remote therefrom.

2. A seal ring according to claim 1, wherein the lip ring (4) is axially nonresilient and the intermediate ring (3) is joined to the reinforcing ring (1) approximately halfway along the axial region (B) bounded by the sealing lip (6) and the end of the support surface (5) remote therefrom.

3. A seal ring according to claim 1, wherein the sealing lip (6) is articulated to the lip ring (4) and the intermediate ring (3) is joined to the reinforcing ring (1) approximately at the midpoint of the axial region occupied by the support surface (5).

* * * * *